(12) United States Patent
Dattalo

(10) Patent No.: US 10,354,116 B2
(45) Date of Patent: Jul. 16, 2019

(54) OPTICAL FINGERPRINT SENSOR WITH SCATTERED LIGHT IMAGE DETECTION

(71) Applicant: Synaptics Incorporated, San Jose, CA (US)

(72) Inventor: Scott Dattalo, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 225 days.

(21) Appl. No.: 15/643,139

(22) Filed: Jul. 6, 2017

(65) Prior Publication Data

US 2019/0012507 A1 Jan. 10, 2019

(51) Int. Cl.
*G06K 9/00* (2006.01)

(52) U.S. Cl.
CPC ........... *G06K 9/0004* (2013.01); *G06K 9/001* (2013.01); *G06K 9/00046* (2013.01); *G06K 9/00087* (2013.01)

(58) Field of Classification Search
CPC .................. G06K 9/0004; G06K 9/00087
See application file for complete search history.

(56) References Cited

U.S. PATENT DOCUMENTS

| | | | |
|---|---|---|---|
| 5,726,443 A | 3/1998 | Immega et al. | |
| 6,134,340 A | 10/2000 | Hsu et al. | |
| 7,177,451 B2 | 2/2007 | Higuchi | |
| 7,769,212 B2 | 8/2010 | Hwang et al. | |
| 8,731,618 B2 | 5/2014 | Jarvis et al. | |
| 9,390,311 B2 | 7/2016 | Kuo et al. | |
| 9,842,245 B1* | 12/2017 | Setterberg | G06K 9/0012 |
| 2008/0002860 A1* | 1/2008 | Super | G06K 9/00375 382/114 |
| 2008/0121442 A1 | 5/2008 | Boer et al. | |

(Continued)

FOREIGN PATENT DOCUMENTS

| | | |
|---|---|---|
| CN | 103942537 A | 7/2014 |
| CN | 104035620 A | 9/2014 |

(Continued)

OTHER PUBLICATIONS

International Search Report and Written Opinion for PCT Application No. PCT/US2018/037067, dated Oct. 2, 2018, 11 pages.

(Continued)

*Primary Examiner* — Edward Park
(74) *Attorney, Agent, or Firm* — Paradice and Li LLP

(57) ABSTRACT

A method and apparatus for authenticating a fingerprint image captured through an optical sensor. For at least some embodiments, light scattering characteristics associated with a fingerprint are determined and compared to a reference light scattering characteristic. The fingerprint is authenticated when the light scattering characteristics are within a threshold difference of the reference light scattering characteristic. For some embodiments, the light scattering characteristics associated with the fingerprint are compared to light scattering characteristics associated with one or more reference (enrollment) images. For at least some embodiments, the light scattering characteristics may be based on a correlation value based on identified pixels and one or more pixels neighboring the identified pixel.

11 Claims, 10 Drawing Sheets

(56) References Cited

U.S. PATENT DOCUMENTS

| | | | |
|---|---|---|---|
| 2008/0317373 A1* | 12/2008 | Aoyama | G06T 7/13 382/269 |
| 2013/0293459 A1 | 11/2013 | Nakamura et al. | |
| 2014/0218327 A1 | 8/2014 | Shi et al. | |
| 2014/0294262 A1 | 10/2014 | Schuckers et al. | |
| 2014/0355846 A1 | 12/2014 | Lee et al. | |
| 2015/0331508 A1 | 11/2015 | Nho et al. | |
| 2016/0247010 A1 | 8/2016 | Huang et al. | |
| 2016/0350580 A1* | 12/2016 | Pyun | G06K 9/00073 |

FOREIGN PATENT DOCUMENTS

| | | |
|---|---|---|
| CN | 104063704 A | 9/2014 |
| CN | 203838722 U | 9/2014 |
| CN | 104182727 A | 12/2014 |
| CN | 204028936 U | 12/2014 |
| WO | WO2015041459 A1 | 3/2015 |

OTHER PUBLICATIONS

DeCann et al., "A Novel Region Based Liveness Detection Approach for Fingerprint Scanners," Advances in Biometrics (2009): 627-636.

Ghiani et al., "Experimental Results on Fingerprint Liveness Detection," Articulated Motion and Deformable Objects (2012): 210-218.

Ojala et al., "Multiresolution Gray-Scale and Rotation Invariant Texture Classification With Local Binary Patterns," IEEE Transactions on Pattern Analysis and Machine Intelligence 24.7 (2002): 971-987.

Rowe et al., "Multispectral Fingerprint Image Acquisition," Advances in Biometrics (2008): 1-20.

U.S. Appl. No. 14/871,810, filed Sep. 30, 2015 and entitled, "Optical Sensor Using Collimator" pp. 1-30.

U.S. Appl. No. 15/199,774, filed Jun. 30, 2016 and entitled, "Optical Fingerprint Sensor Under a Display" pp. 1-47.

U.S. Appl. No. 15/388,722, filed Dec. 22, 2016 and entitled, "Systems and Methods for Spoof Detection Based on Local Binary Patterns" pp. 1-36.

* cited by examiner

| $P_{i-1,j-1}$ | $P_{i,j-1}$ | $P_{i+1,j-1}$ |
|---|---|---|
| $P_{i-1,j}$ | $P_{i,j}$ | $P_{i+1,j}$ |
| $P_{i-1,j+1}$ | $P_{i,j+1}$ | $P_{i+1,j+1}$ |

800

|  | $P_{i,j-1}$ |  |
|---|---|---|
| $P_{i-1,j}$ | $P_{i,j}$ | $P_{i+1,j}$ |
|  | $P_{i,j+1}$ |  |

OPTICAL FINGERPRINT SENSOR WITH SCATTERED LIGHT IMAGE DETECTION

TECHNICAL FIELD

The present embodiments relate generally to biometric sensors, and more specifically to optical fingerprint sensors with scattered light image detection.

BACKGROUND OF RELATED ART

Many devices rely on biometric sensors, such as fingerprint sensors to control user access. For example, a device may include a fingerprint sensor to scan a user's fingerprint and compare the fingerprint scan to a reference image to determine whether the user is granted or denied access.

Conventional optical fingerprint scanners analyze reflected light to perform fingerprint detection. As such, conventional optical fingerprint sensors may be tricked into allowing unauthorized users access to the device. For example, a counterfeit fingerprint (e.g., an image, photo, or sketch of a user's fingerprint) may be presented to the optical fingerprint sensor in place of the user's finger. Due to limitations in analyzing reflected light, a conventional optical fingerprint sensor may be easily deceived by the counterfeit fingerprint.

Thus, there is a need for a fingerprint sensing device with robust protection against false and/or counterfeit fingerprints.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus and method are disclosed for authenticating an image of an input object provided by an optical sensor. An example method is disclosed and may include determining a light scattering characteristic of an input object, comparing the determined light scattering characteristic with a reference light scattering characteristic to determine an authentication status of the input object, and generating a validation signal indicating the authentication status of the object.

In another example, an input device is disclosed and may include an optical sensor configured to receive scattered light from an input object, a processing system coupled to the optical sensor and configured to determine a light scattering characteristic of the input object, compare the determined light scattering characteristic with a reference light scattering characteristic to determine an authentication status of the input object, and generate a validation signal indicating the authentication status of the input object.

In still another example, a non-transitory computer-readable storage medium storing instructions is disclosed that, when executed by one or more processors of a device, cause the device to determine a light scattering characteristic of an input object, compare the determined light scattering characteristic with a reference light scattering characteristic to determine an authentication status of the input object, and generate a validation signal indicating the authentication status of the input object.

BRIEF DESCRIPTION OF THE DRAWINGS

The example embodiments are illustrated by way of example and are not intended to be limited by the figures of the accompanying drawings. Like numbers reference like elements throughout the drawings and specification.

FIG. 8 depicts example pixel maps, in accordance with some embodiments.

DETAILED DESCRIPTION

Figure 1:
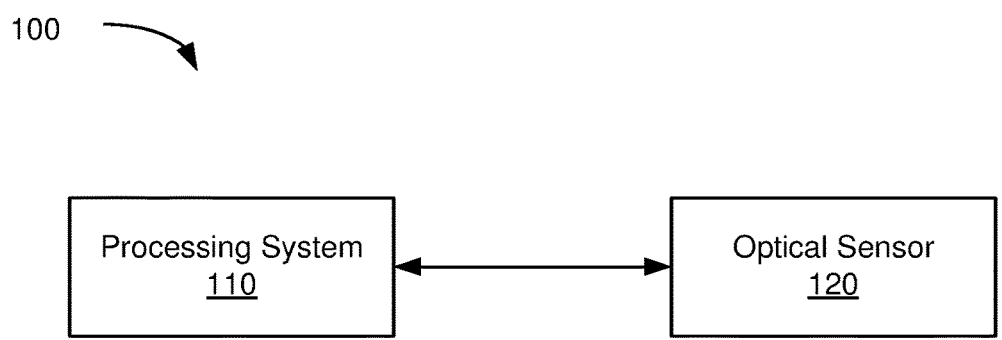
FIG. 1 is a simplified diagram of an input device, in accordance with some embodiments.

In the following description, numerous specific details are set forth such as examples of specific components, circuits, and processes to provide a thorough understanding of the disclosure. The term "coupled" as used herein means coupled directly to or coupled through one or more intervening components or circuits. In addition, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "aggregating", "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. In addition, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

FIG. 1 is a simplified diagram of an input device 100, in accordance with some embodiments. The input device 100 may include a processing system 110 and an optical sensor 120. The input device 100 may be configured to provide an input for an electronic system (not shown for simplicity). As used herein, the term "electronic system" (and/or "electronic device") may broadly refer to any system capable of electronically processing information. Some examples of electronic systems may include personal computers, such as desktop computers, netbook computers, tablet computers, web browsers, e-book readers, personal digital assistants (PDAs), and laptop computers. Further example electronic systems may include peripherals such as data input devices (including remote controls and mice), and data output devices (including display screens and printers). Still further example electronic systems may include remote terminals, kiosks, and video game machines (e.g., video game consoles, portable gaming devices, and the like). Still other example electronic systems may include communication devices (including cellular phones, such as smart phones), and/or media devices (including recorders, editors, and players such as televisions, set-top boxes, music players, digital photo frames, digital cameras, and the like).

The input device 100 may be implemented as a physical part of the electronic system. Thus, by way of example and not limitation, the input device 100 may be included within the electronic system. In other embodiments, the input device 100 may be physically separate from the electronic system. In some aspects, the electronic system may include a display device (not shown for simplicity) for displaying user data such as, for example, web pages, and/or other image data. As appropriate, the input device 100 may communicate with parts of the electronic system via any technically feasible bus, network, and/or wired/wireless communication connection.

The optical sensor 120 may include one or more sensing elements (e.g., light sensing elements) that may detect an object presented within a sensing region associated with the input device 100. The sensing region may encompass any space above, around, in, and/or near the input device 100 through which the input device 100 is able to detect one or more objects. The sizes, shapes, and locations of a particular sensing region may vary from embodiment to embodiment. The distance to which this sensing region extends in a particular direction may be less than a millimeter, one or more millimeters, one or more centimeters, or any other technically feasible distance. The distance may vary based on sensing technology and/or a desired sensing accuracy. In various embodiments, input surfaces of the input device 100 may be provided by surfaces of casings (e.g., a case, a chassis or other physical structure) within which the optical sensor 120 may reside or by face sheets or other cover layers positioned over the optical sensor 120.

In some aspects, the input device 100 may use optical sensing techniques to image or scan objects in the sensing region. For example, one or more light sensing elements (not shown for simplicity) of the optical sensor 120 may detect light within the sensing region. The detected light may be directly reflected from an input object (e.g., a finger and/or fingerprint), scattered from the input object, transmitted (refracted) through the input object, and/or emitted by the input object. The detected light may be in the visible or invisible spectrum (such as infrared or ultraviolet light). Example light sensing elements include photodiodes, phototransistors, thin film detectors, CMOS image sensor arrays, CCD arrays, and any other technically feasible light sensing elements. In some embodiments, an active illumination source may be used to provide light to the sensing region, and reflections from the sensing region may be detected to determine input information corresponding to the fingerprint.

One example optical sensing technique uses direct illumination of the object, which may be in contact with an input surface associated with the sensing region. One or more light sources and/or light guiding structures may be used to direct light to the sensing region. When an object is present within the sensing region, light is scattered from the object. The scattered light may be detected by the optical sensor 120 and used to determine input information corresponding to the detected object. For example, where the input device 100 is used for fingerprint scanning, the input information may correspond to the ridges and/or valleys of a user's finger. In contrast to reflected light, scattered light may be affected by various boundary conditions (e.g., differing indices of refraction of the finger, air, and/or input surface). Thus, the scattered light detected by the optical sensor 120 may exhibit greater variation (e.g., in comparison to reflected light) across the ridges and valleys of the finger in contact and/or near the input surface.

Another example optical technique uses indirect illumination based on internal reflection to detect input objects in contact with and/or near the input surface. One or more illumination sources may direct light through a transmitting medium at an angle at which the light is internally reflected at the input surface. Different refractive indices at opposing sides of the input surface may cause a scattering of light rays. For example, contact of the input surface by the input object may cause a refractive index (associated with a point of contact) to change and alter the associated scattered light characteristics. For example, a finger may be presented on the input surface which, in some embodiments, may include a glass-to-air interface. The higher refractive index of human skin compared to air causes light incident at the input surface at a critical angle to be partially transmitted through the finger, where it would otherwise be totally internally reflected at the glass to air interface. Light may be scattered from the input surface toward the optical sensor 120. The scattered light may be detected by the optical sensor 120 and used to determine the input information associated with the detected object.

In some embodiments, the processing system 110 may be coupled to the optical sensor 120 and may be configured to operate hardware associated with the input device 100 to detect fingerprints within the sensing region. The processing system 110 may include a portion of, or one or more, integrated circuits (ICs) and/or other circuitry components (not shown for simplicity). In some embodiments, components of the processing system 110 may be located together, such as near the optical sensor 120. In other embodiments, components of the processing system 110 may be physically separate from the optical sensor 120. In some aspects, the processing system 110 may include driver circuitry to control one or more illumination sources. In some embodiments, the processing system 110 may provide information associated with the fingerprints to another part of the electronic system (e.g. to a central processing system separate from the processing system 110).

The processing system 110 may generate electrical signals based on scattered light associated with fingerprints detected within the sensing region. The electrical signals may be processed by the processing system 110. For example, the processing system 110 may digitize analog electrical signals obtained from the optical sensor 120. In some embodiments, the processing system 110 may process one or more signals associated with the optical sensor 120. For example, the processing system 110 may determine and remove parasitic offsets native to the optical sensor 120. In another example, the processing system 100 may determine and compensate for any gain variations associated with the optical sensor 120. For example, the processing system 110 may perform filtering and/or other signal conditioning of signals associated with the optical sensor 120.

In some embodiments, the input device 100 may include a touch screen interface, and the sensing region may overlap at least part of an active area of a display screen (not shown for simplicity). For example, the input device 100 may include one or more sensor electrodes overlaying the display screen and provide a touch screen interface for the associated electronic system. The display screen may be any type of dynamic display capable of displaying a visual interface to the user, and may include any type of light emitting diode (LED), organic LED (OLED), cathode ray tube (CRT), liquid crystal display (LCD), plasma, electroluminescence (EL), or other display technology. The display may be flexible or rigid and may be flat, curved or have other geometries. The display may include a substrate for TFT circuitry and may also include a cover glass disposed above the display. In some aspects, the cover glass may form a touch surface of the input device 100. The input device 100 and the display screen may share physical elements. For example, some embodiments may share electrical components with the display screen and the optical sensor 120. In some embodiments, the display screen may be operated in part or in total by the processing system 110.

Figure 2:
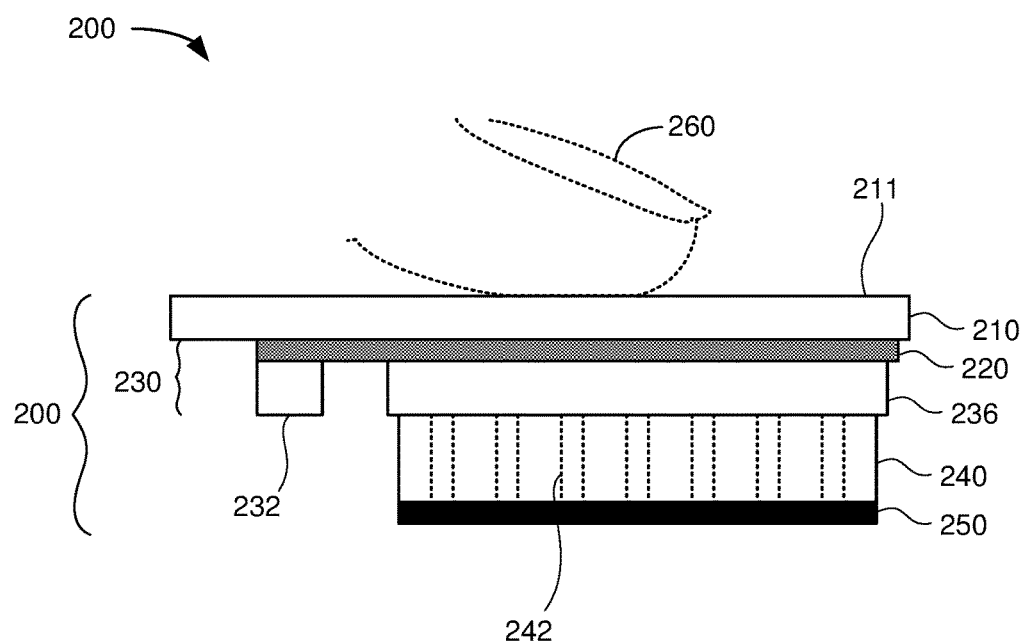
FIG. 2 depicts an example input device, in accordance with some embodiments.

FIG. 2 depicts an example input device 200, in accordance with some embodiments. The input device 200 may be an example embodiment of the input device 100 of FIG. 1. In some aspects, the input device 200 may operate as an optical image sensor to capture a user's fingerprint information (e.g., operate as an optical fingerprint sensor). The input device 200 may include a cover glass 210, a mask 220, an illumination layer 230, a collimator 240, and an image sensor 250. For reference, a finger 260 (depicted by dotted lines and not a part of the input device 200) is shown in contact with the cover glass 210 to provide the fingerprint to be scanned.

The cover glass 210 may be formed from glass, transparent and/or translucent polymeric materials, or any other technically feasible material. The cover glass 210 may protect the image sensor 250 (as well as any intervening components) and may also provide a touch surface 211 for the input device 100. For example, a first surface of the cover glass 210 may be used as the touch surface 211.

The mask 220 may be disposed proximate (and in some cases bonded) to a second surface of the cover glass 210. The mask 220 may occlude (block) one or more light rays traveling to or from the cover glass 210. In some embodiments, the mask 220 may be formed from electrodes, conductive traces, or other elements and/or components associated with the input device 100. For example, the mask 220 may be associated with a display device (not shown for simplicity) used in conjunction with the electronic system. In some embodiments, the mask 220 may include a repeating pattern of light blocking elements.

The illumination layer 230 may include a light source 232 and a light guiding element 236. In some aspects, a first surface of the illumination layer 230 may be disposed (and/or bonded) to a second surface of the mask 220. The light source 232 may be an incandescent lamp, a clear or colored light emitting diode (LED), an organic LED (OLED) or any other technically feasible light source capable of emitting visible and/or invisible light rays. In some embodiments, the light source 232 may be associated with the display device, such as a display back light and/or the display device itself. The light guiding element 236 may receive light from the light source 232 and may guide and/or emit light near and/or around the cover glass 210. In some aspects, the light guiding element 236 may include reflecting surfaces to direct light toward the touch surface 211. In some other aspects, the light guiding element 236 may direct light via total internal reflection.

A first surface of the collimator 240 may be disposed (and/or bonded) proximate to a second surface of the illumination layer 230. For example, the collimator 240 may be bonded to a second surface of light guiding element 236 and may include a plurality of apertures 242 (shown with dotted lines). The collimator 240 may be formed from plastics such as polycarbonate, polyethylene terephthalate (PET), polyimide, carbon black, inorganic insulating or metallic materials, or the like. The apertures 242 may be formed by laser drilling, etching, or any other technically suitable technique.

The collimator 240 may be positioned between the light guiding element 236 and the image sensor 250. The image sensor 250 may include a plurality of light sensing elements (not shown for simplicity).

The apertures 242 may be positioned (located) above respective light sensing elements of the image sensor 250. Thus, the apertures 242 may guide light rays from the cover glass 210 and/or the illumination layer 230 to the light sensing elements of the image sensor 250. In some aspects, the apertures 242 may limit light rays reaching the image sensor 250 by limiting the angle of light rays that may impinge the light sensing elements.

In operation, light rays from the illumination layer 230 may be directed toward the cover glass 210. Although the user's finger 260 may be in contact with the touch surface 211 of the cover glass 210, the ridges and valleys of the finger may prevent complete and/or uniform contact with the touch surface 211. Light may scatter differently from the ridges and valleys. In other words, light rays may scatter differently as they impinge on the user's flesh (e.g., a ridge) in contrast to when the light rays impinge on air (e.g., an air pocket formed by a valley). The light scattering may be based on the different indices of refraction associated with the user's finger and air. This scattering property may advantageously be used to enhance fingerprint verification, as described below with respect to FIGS. 3-7.

Figure 3:
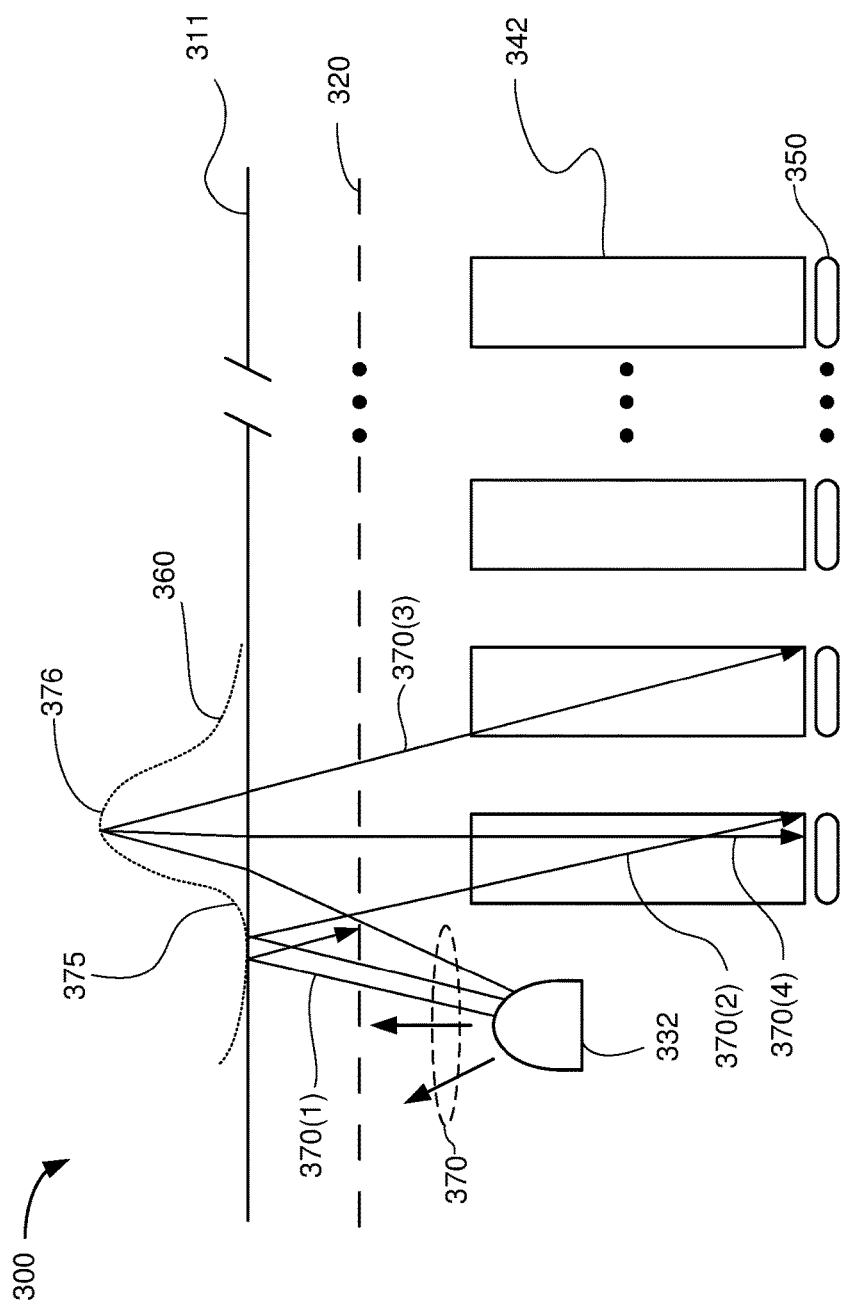
FIG. 3 depicts another example input device, in accordance with some embodiments.

FIG. 3 depicts another example input device 300, in accordance with some embodiments. The input device 300 may be an example embodiment of the input device 100 of FIG. 1 and/or the input device 200 of FIG. 2. The input device 300 includes a touch surface 311, a mask 320, a light source 332, collimators 342, and light sensing elements 350. The touch surface 311 may be an embodiment of the touch surface 211 of FIG. 2 and may include a cover glass (not shown for simplicity). A finger 360 (or other input object) may be disposed upon and/or adjacent to the touch surface 311. For simplicity, only a portion of the finger 360 is shown in the example of FIG. 3 (depicted by the dotted lines). Also for simplicity, the light source 332 is depicted below the mask 320. In some other embodiments, the light source 332 may be between the mask 320 and the touch surface 311. The mask 320 is disposed proximate to and generally underneath the touch surface 311. The mask 320 may be an embodiment of the mask 220 of FIG. 2. As shown, the mask 320 may include one or more elements that may block light rays to and/or from the touch surface 311.

The light source 332 may generate light rays 370 that may scatter at or near the touch surface 311. The light source 332 may be an embodiment of the light source 232 of FIG. 2. In some embodiments, light rays may be provided by a light guiding device (not shown for simplicity).

Light sensing elements 350 may detect light rays scattered from the finger 360, and may generate output signals based on the scattered light. The output signals from the light sensing elements 350 may be processed to generate a fingerprint image. The fingerprint image may be used to enroll a user and/or to verify a user's identity. In some aspects, light rays may be occluded by the mask 320. For example, light ray 370(1) may be reflected at the touch surface 311 and subsequently occluded by the mask 320. As shown, light ray 370(1) may also interact with a fingerprint ridge 375 in contact with the touch surface 311. As a result of impinging the mask 320, light ray 370(1) is not detected by the light sensing elements 350.

In other aspects, one or more light sensing elements 350 may detect light rays scattered from the fingerprint ridge 375. For example, light ray 370(2) may scatter at the touch surface 311 based on the fingerprint ridge 375. In some embodiments, the scattering angle of the light ray 370(2) may be due at least in part to an index of refraction associated with the user's finger. Light ray 370(2) travels through the mask 320, and through the collimators 342, to at least one of the light sensing elements 350. The collimators 342 may guide the light ray 370(2) to corresponding light sensing elements 350 by limiting the angles of scattered light rays which may be transmitted through the collimators 342. In some embodiments, lenses may be used in place of collimators 342.

Still further, in some aspects, one or more light sensing elements 350 may detect light rays scattered from a fingerprint valley 376. For example, light ray 370(3) may scatter at the fingerprint valley 376 due at least in part to an index of refraction of air. Light ray 370(3) travels through the mask 320, and through the collimators 342, to at least one of the light sensing elements 350. As described above, the collimators 342 may guide light ray 370(3) to corresponding light sensing elements 350. In a similar manner, light ray 370(4) may also be scattered from the fingerprint valley 376. Light ray 370(4) may follow a different path to a different light sensing element 350.

As illustrated, the scattering properties of light rays due to fingerprint ridges may be different than those associated with fingerprint valleys. Moreover, because a fingerprint is unique to a user, the scattering properties associated with a fingerprint may also be unique. In some embodiments, the input device 300 may compare light scattering characteristics associated with an input object (e.g., fingerprint) with a reference light scattering characteristic to verify a user's identity. This operation is described in more detail below in conjunction with FIG. 4.

Figure 4:
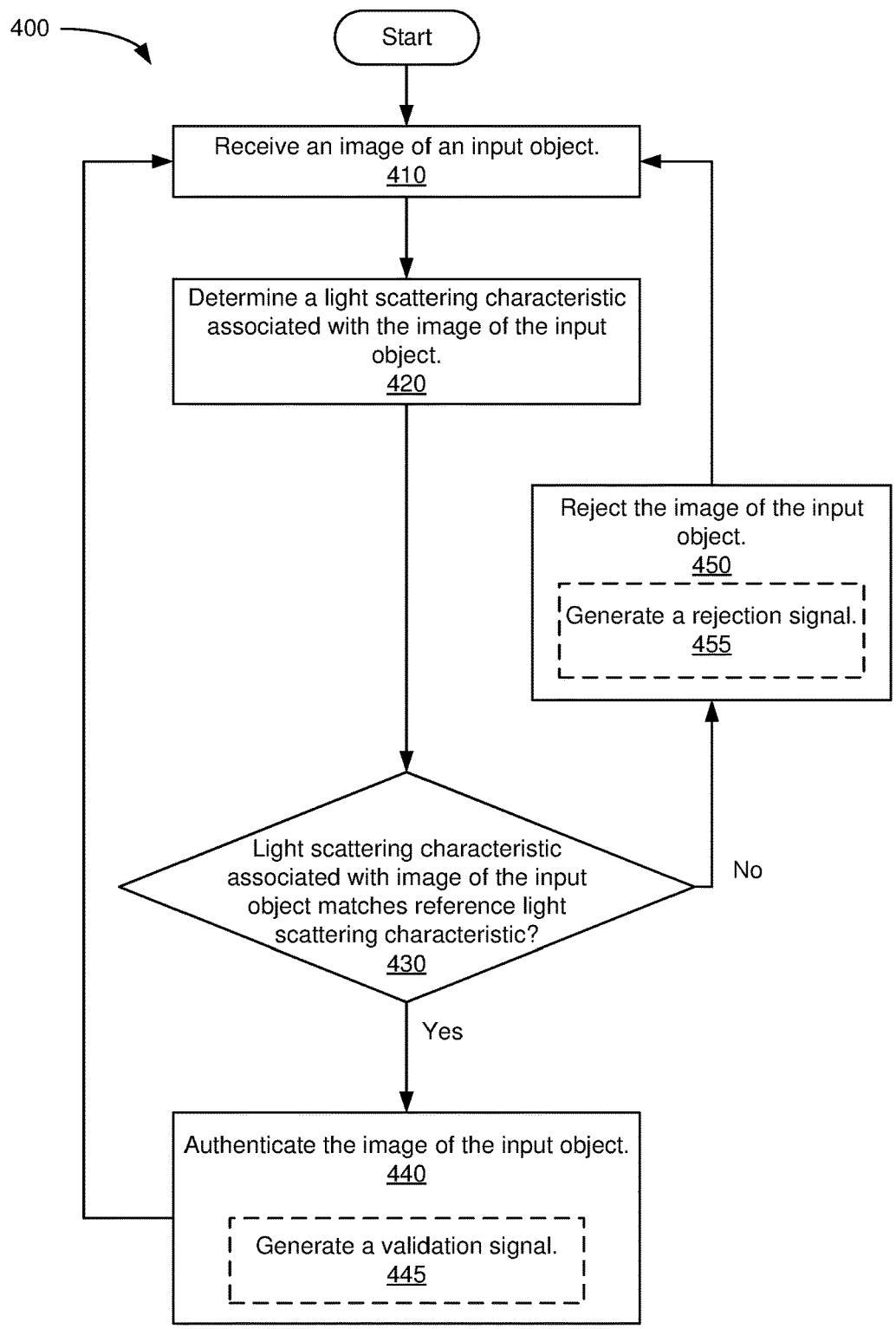
FIG. 4 is an illustrative flow chart depicting an example operation for verifying an input object, in accordance with some embodiments.

FIG. 4 is an illustrative flow chart depicting an example operation 400 for verifying an input object, in accordance with some embodiments. By way of example, the operation 400 may be performed by the processing system 110 of FIG. 1. In other embodiments, the operation 400 may be performed by a processor (including a general-purpose processor) associated with an electronic system, a state machine or any other technically feasible device. In some embodiments, the operation 400 may include fewer or more steps than those depicted in the example of FIG. 4. Further, two or more of the steps may be performed in a different order and/or in parallel. The operation 400 is described herein with reference to the input devices 100, 200, and 300 of FIGS. 1-3.

The processing system 110 first receives an image of an input object (410). For example, the light sensing elements 350 may receive light scattered from a fingerprint to generate the image (e.g., image data) of the input object. In some embodiments, the image of the input object may include a plurality of pixels. Next, the processing system 110 determines a light scattering characteristic associated with the image of the input object (420). In some embodiments, the light scattering characteristic may be a metric of scattered light based on one or more pixel correlation values. A pixel correlation value may represent a comparison of pixel values of an identified ridge pixel or valley pixel with pixel values of one or more nearby and/or neighboring pixels. A ridge pixel may be an image pixel associated with a ridge of a fingerprint and a valley pixel may be an image pixel associated with a valley of a fingerprint. In some embodiments, the light scattering characteristics may include an aggregate of the ridge pixel correlation values and the valley pixel correlation values associated with the image of the input object. A process for determining the light scattering characteristics associated with the image of the input object is described in more detail with respect to FIG. 7.

Next, the processing system 110 determines whether the light scattering characteristic associated with the image of the input object matches a reference light scattering characteristic (430). In some embodiments, the reference light scattering characteristic may be a reference value determined through bench testing or analysis of one or more data sets associated with a plurality of fingerprints. Use of the reference light scattering characteristic may allow a rapid determination regarding the validity of the image of the input object. In some embodiments, the light scattering characteristic associated with the image of the input object and the reference light scattering characteristic may each be represented by a numerical value, and a difference between the two may be determined. A match may be determined when the light scattering characteristic associated with the image of the input object and the reference light scattering characteristic do not differ by more than a difference threshold. In some embodiments, neural net scoring or other complex scoring or determination processes may be used to determine the match based on the light scattering characteristic or based on the difference between the light scattering characteristic associated with the image and the reference light scatting characteristic. If the light scattering characteristic associated with the image of the input object matches the reference light scattering characteristic, then the processing system 110 authenticates the image of the input object (440). Thus, if the processing system 110 determines the input object to be the fingerprint of an authorized user, the processing system 110 may authenticate the input object (e.g., fingerprint). In some embodiments, the processing system 110 may generate a validation signal (445) upon authenticating the input object. The validation signal may indicate an authentication status of the image of the input object for the electronic system. For example, the validation signal may indicate that the light scattering characteristic of the image of the input object is a positive match to the reference light scattering characteristic.

If the light scattering characteristic associated with the image of the input object does not match reference light scattering characteristic (e.g., the light scattering characteristic associated with the image of the input object is not within the difference threshold of the reference light scattering characteristic), then the processing system 110 rejects the image of the input object (450). In some embodiments, the processing system 110 may generate a rejection signal (455) or may simply refrain from asserting the validation signal.

In some embodiments, the reference light scattering characteristic (described in 420 above) may be associated with one or more enrollment images. For example, one or more enrollment images may be analyzed to determine one or more light scattering characteristics. These light scattering characteristics may be used to verify input objects. This is described in more detail below in conjunction with FIG. 5.

Figure 5:
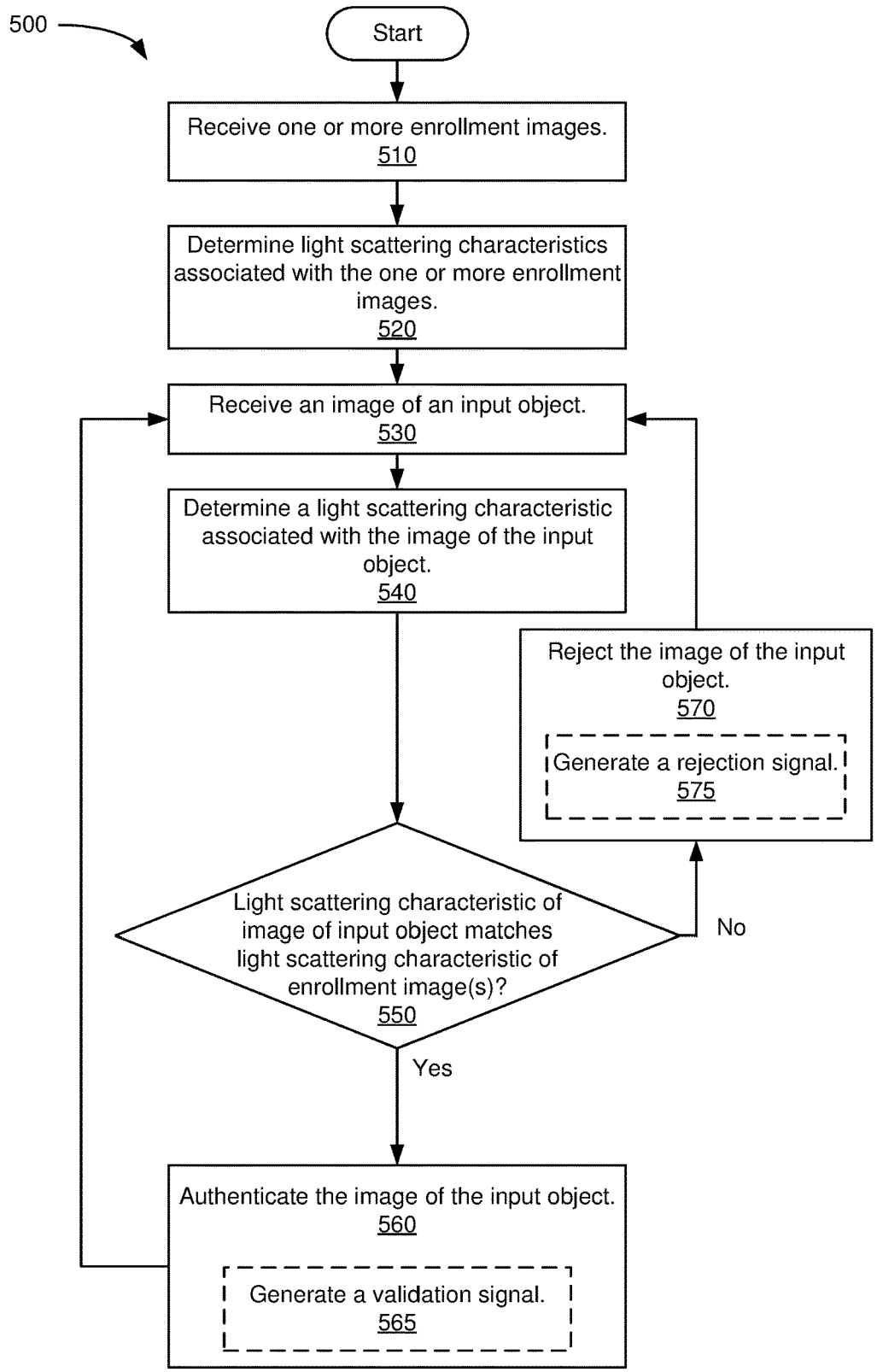
FIG. 5 is an illustrative flow chart depicting another example operation for verifying an input object, in accordance with some embodiments.

FIG. 5 is an illustrative flow chart depicting another example operation 500 for verifying an input object, in accordance with some embodiments. The operation 500 may be performed by the processing system 110 of FIG. 1. Thus, the operation 500 is described herein with reference to the input devices 100, 200, and 300 of FIGS. 1-3.

The processing system 110 first receives one or more enrollment images (510). For example, the light sensing elements 350 may receive light scattered from a fingerprint to generate the one or more enrollment images (e.g., image data associated with the one or more enrollment images). In some aspects, the light sensing elements 350 may capture a set of N images of a user's fingerprint. The set of N images may be referred to as enrollment images since they may be used to enroll the user with the input device 100. Next, the processing system 110 may determine light scattering characteristics associated with the one or more enrollment images (520). In some embodiments, the light scattering characteristics may be a metric of scattered light based on a first set of pixel correlation values. For example, the first set of pixel correlation values may include an overall ridge pixel correlation value and an overall valley pixel correlation value associated with the one or more enrollment images.

The overall ridge pixel correlation value may be based on image ridge pixel correlation values associated with each enrollment image. In a similar manner, the overall valley pixel correlation value may be based on image valley pixel correlation values associated with each enrollment image. A process for determining the light scattering characteristics associated with the one or more enrollment images (e.g., determining the first set of correlation values) is described in more detail below with respect to FIG. 6.

Next, the processing system 110 receives an image of the input object (530). For example, the light sensing elements 350 may receive light scattered from a user's fingerprint to generate the image of the input object. Next, the processing system 110 determines a second set of light scattering characteristics associated with the image of the input object (540). In some embodiments, the second set of light scattering characteristics may be a metric of scattered light based on a second set of pixel correlation values. For example, the second set of correlation values may include an aggregate of ridge pixel correlation values and valley pixel correlation values associated with the image of the input object. A process for determining the light scattering characteristics associated with the image of the input object is described in more detail below with respect to FIG. 7.

Next, the processing system 110 determines whether the light scattering characteristics associated with the image of the input object matches the light scattering characteristics associated with the one or more enrollment images (550). In some embodiments, the first set of correlation values (a first metric of scattered light determined at 520) is compared to the second set of correlation values (a second metric of scattered light determined at 540). If the light scattering characteristics of the image of the input object matches the light scattering characteristics of the one or more enrollment images (e.g., the first set of correlation values and the second set of correlation values differ by less than a difference threshold), then the processing system 110 authenticates the image of the input object (560). In some embodiments, the processing system 110 may generate a validation signal (565) upon authenticating the image of the input object. The validation signal may indicate an authentication status of the image of the input object for the electronic system. For example, the validation signal may indicate that the light scattering characteristic of the image of the input object is a positive match to the light scattering characteristic of the one or more enrollment images.

If the light scattering characteristics associated with the image of the input object do not match the light scattering characteristics associated with the one or more enrollment images, (e.g., the first set of correlation values is not within a threshold difference of the second set of correlation values), then the processing system 110 rejects the image of the input object (570). In some embodiments, the processing system 110 may generate a rejection signal (575) or may simply refrain from asserting the validation signal.

Figure 6:
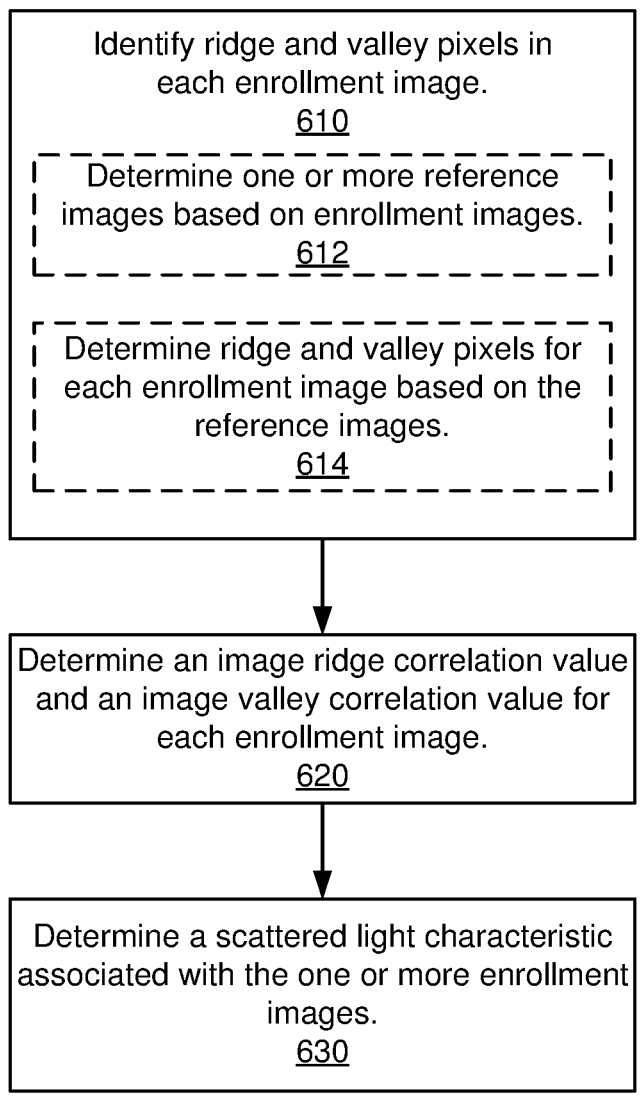
FIG. 6 is an illustrative flow chart depicting an example operation for determining light scattering characteristics associated with the one or more enrollment images.

FIG. 6 is an illustrative flow chart depicting an example operation 600 for determining light scattering characteristics associated with the one or more enrollment images. As described above with respect to FIG. 5, the light scattering characteristics associated with the one or more enrollment images may include an overall ridge pixel correlation value and an overall valley pixel correlation value associated with the one or more enrollment images. The overall ridge pixel correlation value may be based on image ridge pixel correlation values associated with each enrollment image. Furthermore, the image ridge pixel correlation value may be based on a plurality of individual ridge pixel correlation values associated with each enrollment image. In a similar manner, the overall valley pixel correlation value may be based on image valley pixel correlation values associated with each enrollment image. Furthermore, the image valley pixel correlation value may be based on a plurality of individual valley ridge pixel correlation values.

The processing system 110 first identifies ridge pixels and valley pixels within each enrollment image (610). Persons skilled in the art will appreciate that there are many technically feasible ways to identify ridge pixels and valley pixels within an image. One possible procedure is shown in FIG. 6 with dashed lines. To begin, the processing system 110 determines one or more reference images based on the one or more enrollment images (612). In one embodiment, the processing system 110 may determine a "mean" reference image and a "standard deviation" reference image. The mean reference image may be an array of pixels (similar in dimension to the one or more enrollment images), where each pixel of the array is based on an arithmetic mean of all similarly positioned pixels in each of the enrollment images. For example, each enrollment image in the set of N enrollment images may be denoted EI(n), where n is the index of enrollment images (e.g., 1<=n<=N). Each enrollment image EI(n) may include a two-dimensional array of pixels, each pixel denoted by EI(n)$_{i,j}$, where i is the column index and j is the row index. The mean reference image may be denoted by μ. Values (pixels) of the mean reference image ($\mu_{i,j}$) may be expressed by equation 1, below:

$$\mu_{i,j} = \frac{1}{N}\sum_{x=1}^{N} EI(x)_{i,j} \quad [1]$$

Where:
$\mu_{i,j}$ is the mean value at the (i,j) location of the μ reference image;
N is the number of enrollment images;
i and j are array indices; and
EI(x)$_{i,j}$ is the value of the (i,j) pixel of the xth enrollment image.

In a similar manner, the processing system 110 may determine a standard deviation reference image based on the pixels of the mean reference image μ and the pixels of the one or more enrollment images. The standard deviation reference image may be denoted by σ. Values (pixels) of the standard deviation reference image ($\sigma_{i,j}$) may be expressed by equation 2, below:

$$\sigma_{i,j} = \sqrt{\frac{1}{N}\sum_{x=1}^{N} (\mu_{i,j} - EI(x)_{i,j})^2} \quad [2]$$

Where
$\sigma_{i,j}$ is the standard deviation value at the (i,j) location of the σ reference image;
N is the number of enrollment images;
$\mu_{i,j}$ is the mean value at the (i,j) location of the μ reference image
i and j are array indices; and
EI(x)$_{i,j}$ is the pixel value of the i,j pixel of the xth enrollment image.

Although the standard deviation reference image, as described above, is based on equation 2, in other embodiments, other deviation reference images may be used based on other mathematical relationships. Persons having ordinary skill in the art will appreciate that other mathematical relationships to describe deviation from a mean value may be used to determine a deviation reference image. In one example, a sum of the absolute value of the first order differences may be used in place of equation 2.

Next, the processing system 110 determines ridge pixels and valley pixels for each enrollment image based on the one or more reference images (614). For example, ridge pixels for each enrollment image may be denoted by RDG_EI(n)$_{i,j}$ and may be expressed by equation 3, below:

$$RDG\_EI(n)_{i,j} = EI(n)_{i,j} < \mu_{i,j} - 2\sigma_{i,j} \quad [3]$$

Where
RDG_EI(n)$_{i,j}$ is the value of a (i,j) ridge pixel of the nth enrollment image;
EI(n)$_{i,j}$ is the pixel value of the (i,j) pixel of the EI(n) enrollment image;
$\mu_{i,j}$ is the value of the (i,j) location of the μ image; and
$\sigma_{i,j}$ is the value of the (i,j) location of the σ image.

Thus, all pixels in the enrollment image EI(n) satisfying equation 3 may correspond to ridge pixels. In a similar manner, the processing system 110 may determine valley pixels VLY_EI(n)$_{i,j}$ for each enrollment image as expressed by equation 4, below:

$$VLY\_EI(n)_{i,j} = EI(n)_{i,j} > \mu_{i,j} + 2\sigma_{i,j} \quad [4]$$

Where
VLY_EI(n)$_{i,j}$ is the value of a (i,j) valley pixel of the nth enrollment image;
EI(n)$_{i,j}$ is the pixel value of the (i,j) pixel of the EI(n) enrollment image;
$\mu_{i,j}$ is the value of the (i,j) location of the μ image; and
$\sigma_{i,j}$ is the value of the (i,j) location of the σ image.

Thus, all pixels in the enrollment image EI(n) satisfying equation 4 may correspond to valley pixels.

As noted above, persons skilled in the art will appreciate that ridge and valley pixels may identified in various technically feasible ways. For example, in some aspects, ridge pixels may be viewed as complementary to valley pixels. Taking advantage of this relationship, an image may be processed by a Gaussian function to identify the ridge and valley pixels. For example, an appropriately scaled two-dimensional function of second-order partial differentials of a Gaussian function (such as a Hessian matrix) may be used to estimate (identify) ridge and/or valley pixels. In another example, an image may be processed (filtered) by a Gaussian function, such as a second-order Gaussian equation. The resulting filtered image may be fit to a trigonometric cosine function and quantized to produce a binary image. The binary image may be processed, for example with a two-dimensional thinning algorithm, to identify ridges. Still other approaches, not mentioned here, may be used to identify ridge and valley pixels within each enrollment image in 610.

Next, the processing system 110 determines an image ridge correlation value and an image valley correlation value for each enrollment image (620). In some aspects, a correlation value may indicate how well-correlated neighboring pixels are with respect to a particular pixel. For example, a pixel correlation value may be based on a comparison of an identified (ridge and/or valley) pixel with one or more neighboring pixels.

The image ridge correlation value may be an aggregate of individual ridge pixel correlation values associated with a selected enrollment image. As used herein, the term aggregate may refer to an average, a median or any other technically feasible statistic and/or arithmetic operation. In a similar manner, the image valley correlation value may be an aggregate of individual valley pixel correlation values associated with the selected enrollment image. In some aspects, a light scattering characteristic for each enrollment image may correspond to the image ridge correlation value and the image valley correlation value.

In one embodiment, a pixel correlation value (Pixel_Corr·Value_$P_{i,j}$) of a particular pixel $P_{i,j}$ may be determined based on eight neighboring pixels surrounding the identified ridge or valley pixel. Referring also to pixel map 800 shown in FIG. 8, a pixel correlation value may be expressed by equation 5, below:

$$\text{Pixel\_Corr·Value\_}P_{i,j} = \Sigma_{m=-1}^{1} \Sigma_{n=-1}^{1} |P_{i,j} - P_{i+m,j+n}| \quad [5]$$

Note that the pixel correlation value of equation 5 may be applied to ridge pixels as well as valley pixels. Thus, to calculate a ridge pixel correlation value, $P_{i,j}$ is a selected ridge pixel. To calculate a valley pixel correlation value, $P_{i,j}$ is a selected valley pixel.

As expressed in equation 5, the pixel correlation value for a selected pixel expresses a range of values between the selected pixel and the neighboring pixels. Conventionally, a correlation value increases when compared elements are similarly valued. Notably, however, the pixel correlation value is based on a difference between pixel values. Thus, correlated (similar) pixel values have a small pixel correlation value while dissimilar pixel values have a large pixel correlation value. For example, if neighboring pixels are similarly valued with respect to a selected pixel, then the pixel correlation value may be small (the difference between pixel values is small, hence the sum determined by the correlation value is also small). On the other hand, if the neighboring pixels are not similarly valued with respect to the selected pixel, then the pixel correlation value may be large (the difference between the pixel values is large, hence the sum determined by the correlation value is also large).

In another embodiment, a subset of the eight pixels neighboring the selected pixel may be used to determine the pixel correlation value. For example, referring again to pixel map 810 of FIG. 8, four pixels may be used (e.g., pixels immediately above, below, to the left, and to the right of pixel $P_{i,j}$) to determine the pixel correlation value for a selected pixel. In still another embodiment, neighboring pixels may be spaced away from the selected pixel by one or more pixels. Referring to pixel map 820 of FIG. 8, four pixels spaced by at least one pixel from the selected pixel $P_{i,j}$ may be used to determine the pixel correlation value. Thus, neighboring pixels may be adjacent to ("touching") or separated from pixel $P_{i,j}$ by any technically feasible number of pixels to determine pixel correlation values.

The individual ridge pixel correlation values of each enrollment image may be aggregated together to determine the image ridge pixel correlation value. In a similar manner, individual valley correlation values of each enrollment image may be aggregated together to determine the image valley pixel correlation value. Therefore, N enrollment images may have N image ridge correlation values and N image valley correlation values.

Next, the processing system 110 determines a scattered light characteristic associated with the one or more enrollment images (630). In some embodiments, the processing system 110 may determine the overall ridge correlation value and the overall valley correlation value based on the image ridge correlation values and image valley correlation values of each enrollment image. The overall ridge correlation value may be an average of the N image ridge correlation values determined in 620. Similarly, the overall valley correlation value may be an average of the N image valley correlation values determined in 620. Therefore, the scattered light characteristics of the one or more enrollment images may include the overall ridge correlation value and the overall valley correlation value.

Figure 7:
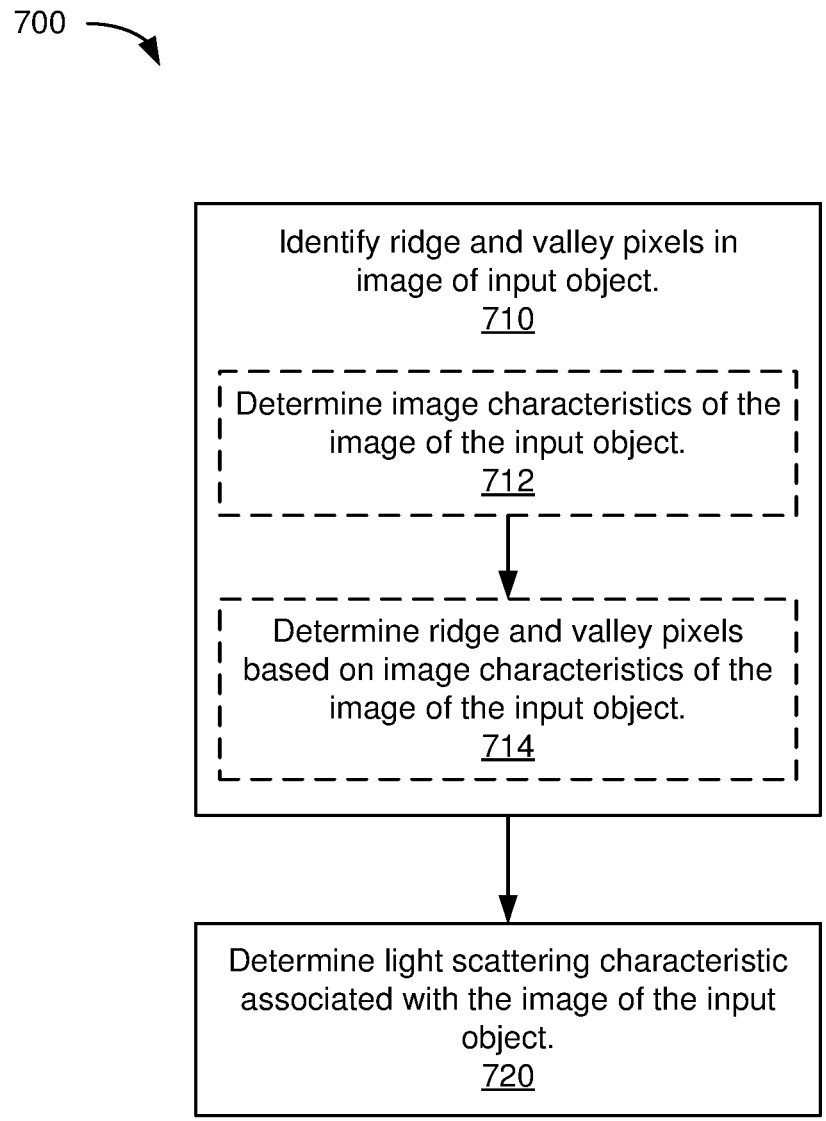
FIG. 7 is an illustrative flow chart depicting an example operation for determining a set of correlation values associated with the image of the input object.

FIG. 7 is an illustrative flow chart depicting an example operation 700 for determining a set of correlation values associated with the image of the input object. The processing system 110 first identifies ridge and valley pixels in the image of the input object (710). As noted above, there are many ways to identify ridge and valley pixels within an image. One possible procedure is disclosed herein and shown in FIG. 7 with dashed lines. To begin, the processing system 110 determines image characteristics of the image of the input object (712). For example, the processing system 110 may determine mean (μv) and standard deviation (σv) values based on the pixels included in the image of the input object. The μv value may be an arithmetic mean of all the pixels in the image of the input object. The σv value may be a standard deviation of all the pixels in the image of the input object based on the μv value.

Next, the processing system 110 determines the ridge and valley pixels of the image of the input object based on the image characteristics of the image of the input object (714). In some embodiments, ridge pixels may satisfy equation 6, below:

$$RDG\_\text{Inp}_{i,j} = \text{Inp}_{i,j} < \mu_v - 2\sigma_v \quad [6]$$

Where
  $RDG\_\text{Inp}_{i,j}$ is the value of a ridge pixel of the image of the input object;
  $\text{Inp}_{i,j}$ is the pixel value of the (i,j) pixel of the image of the input object;
  $\mu_v$ is the mean value of the image of the input object; and
  $\sigma_v$ is the standard deviation value of the image of the input object.

Thus, pixels $\text{Inp}_{i,j}$ in the image of the input object satisfying equation 6 may correspond to ridge pixels. In a similar manner, valley pixels of the image of the input object may satisfy equation 7, below:

$$VLY\_\text{Inp}_{i,j} = \text{Inp}_{i,j} > \mu_v + 2\sigma_v \quad [7]$$

Where
  $VLY\_\text{Inp}_{i,j}$ is the value of a valley pixel of the image of the input object;
  $\text{Inp}_{i,j}$ is the pixel value of the (i,j) pixel of the image of the input object;
  $\mu_v$ is the mean value of the image of the input object; and
  $\sigma_v$ is the standard deviation value of the image of the input object.

Next, the processing system 110 determines a light scattering characteristic associated with the image of the input object (720). In some embodiments, the processing system 110 determines image ridge and image valley correlation values for the image of the input object. Similar to the method described above with respect to FIG. 6, the processing system 110 may first determine a pixel correlation value for every ridge and valley pixel identified in 710. For example, for a ridge or valley pixel $Inp_{i,j}$:

$$\text{Pixel\_Corr·Value}_{i,j} = \Sigma_{m=-1}^{1} \Sigma_{n=-1}^{1} |Inp_{i,j} - Inp_{i+m,j+n}| \qquad \text{eq. 8}$$

Note that, equation 8 determines a ridge pixel correlation value or a valley pixel correlation value based on the selected input object pixel. As described above with respect to FIG. 7, although equation 8 determines the pixel correlation value based on eight neighboring pixels, in another embodiment, fewer than eight pixels may be used. In addition, in some embodiments, neighboring pixels may be spaced from the ridge pixel or the valley pixel by one or more pixels.

The image ridge correlation value of the image of the input object may be based on an aggregate of individual ridge pixel correlation values determined for the image of the input object. In a similar manner, the image valley pixel correlation value of the image of the input object may be based on an aggregate of individual valley correlation values determined for the image of the input object. Therefore, a scattered light characteristic of the image of the input object may include the image ridge correlation value and the image valley correlation value of the image of the input object.

Thus, as described with respect to FIGS. 4-7, since ridges and/or valleys of a fingerprint each scatter light differently, the scattered light characteristics determined by an input device (such as any of input devices 100, 200, and/or 300) may be used to authenticate or reject an image of the input object. It is further noted that counterfeit (e.g., printed) images typically have uniform light scattering properties. Thus, because light scattered from an actual user's finger may not have uniform light scattering properties, the input device may be capable of distinguishing actual fingerprints from false/counterfeit fingerprint images.

Figure 9A:
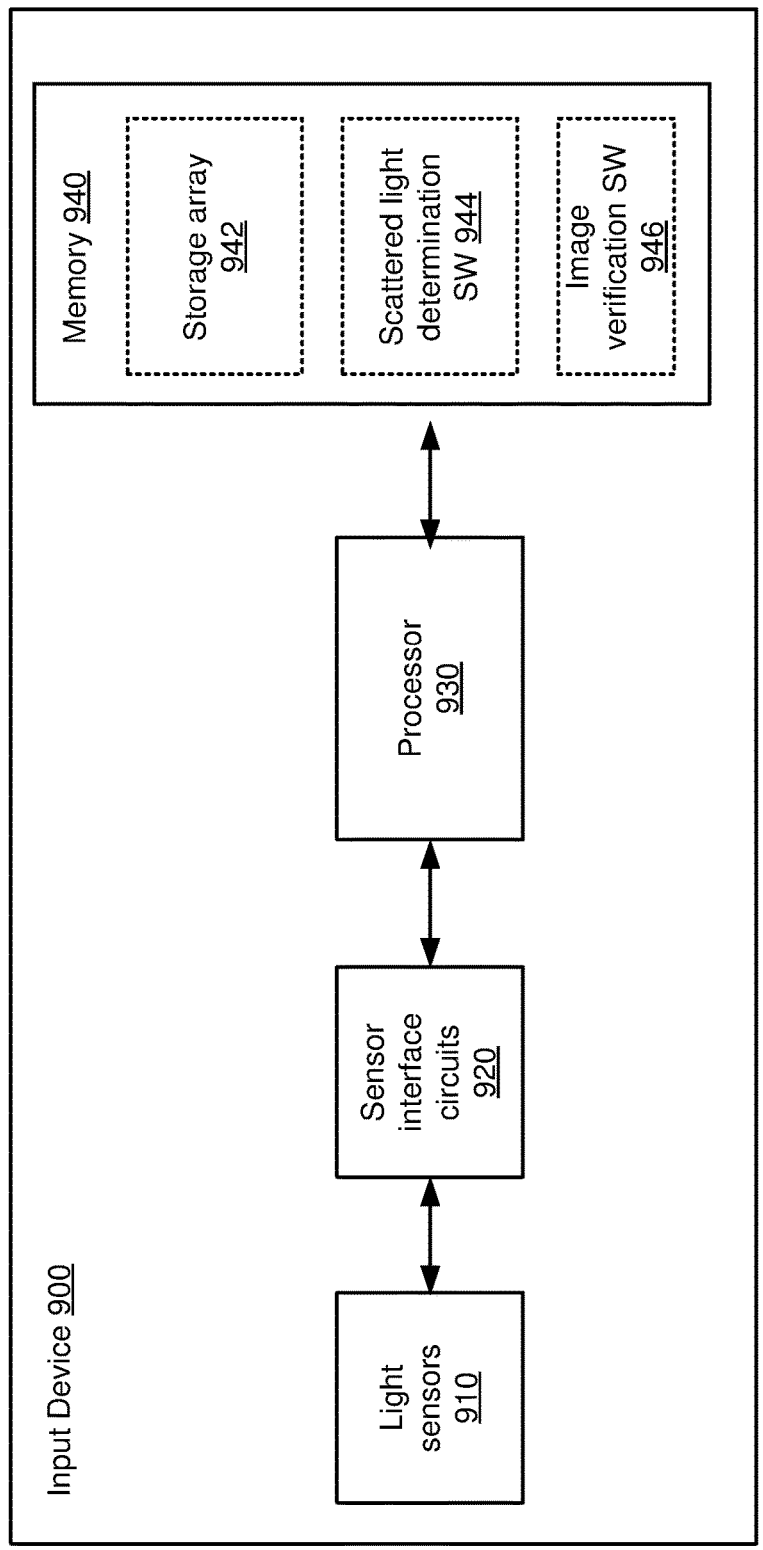
FIGS. 9A-9B show block diagrams of other embodiments of input devices.

FIG. 9A shows a block diagram of an input device 900. In some aspects, the input device 900 may be an example embodiment of any of the input devices 100, 200, or 300 described above with respect to FIGS. 1-3. The input device 900 may include light sensors 910, a sensor interface circuit 920, a processor 930, and a memory 940. In some aspects, the light sensors 910 may include one or more light sensing elements (such as light sensing elements 350 of FIG. 3). The light sensors 910 may receive scattered light associated with input objects presented within a sensing region (not shown for simplicity) associated with the input device 900. The sensor interface circuits 920 may include one or more signal processing devices (signal amplifiers, filters, buffers, analog-to-digital converters and the like) to process signals from the light sensors 910 for the processor 930 to determine pixel values associated with one or more input objects detected by the light sensors 910.

The processor 930 may be coupled to the light sensors 910 through the sensor interface circuits 920. In some aspects, the processor 930 may be an embodiment of the processing system 110 of FIG. 1. For example, the processor 930 may be any one or more suitable processors capable of executing scripts or instructions of one or more software programs stored in the input device 900 (such as within the memory 940).

The memory 940 may include a storage array 942 that may store one or more reference light characteristics. As described with respect to FIG. 4, reference light characteristics may be determined via bench tests or other technically feasible approaches. In some aspects, the reference light characteristics may also correspond to scattered light characteristics associated with one or more enrollment images.

Further, memory 940 may also include a non-transitory computer-readable storage medium (e.g., one or more non-volatile memory elements, such as EPROM, EEPROM, Flash memory, a hard drive, etc.) that may store the following software (SW) modules:
- a scattered light determination SW module 944 to determine scattered light characteristics associated with image data; and
- an image verification SW module 946 to authenticate an image of the input object.

The processor 930 may execute the scattered light determination SW module 944 to determine one or more scattered light characteristics associated with data associated with one or more images. In some embodiments, the processor 930 may determine scattered light characteristics associated with ridge and/or valley pixels identified within an image of a fingerprint. In some aspects, the scattered light characteristics may be based on pixel values of one or more pixels neighboring to the identified ridge and/or valley pixel. In some other embodiments, the scattered light characteristics may be based on a single image (such as an image of the input object) and/or plurality of images (such as a set of enrollment images).

The processor 930 may execute the image verification SW module 946 to authenticate an image of the input object based on scattered light characteristics. In some embodiments, the processor 930 may compare scattered light characteristics of the image of the input object to a reference scattered light characteristic. In some other embodiments, the processor 930 may compare the scattered light characteristics of the image of the input object to scattered light characteristics of one or more images, including enrollment images.

Figure 9B:
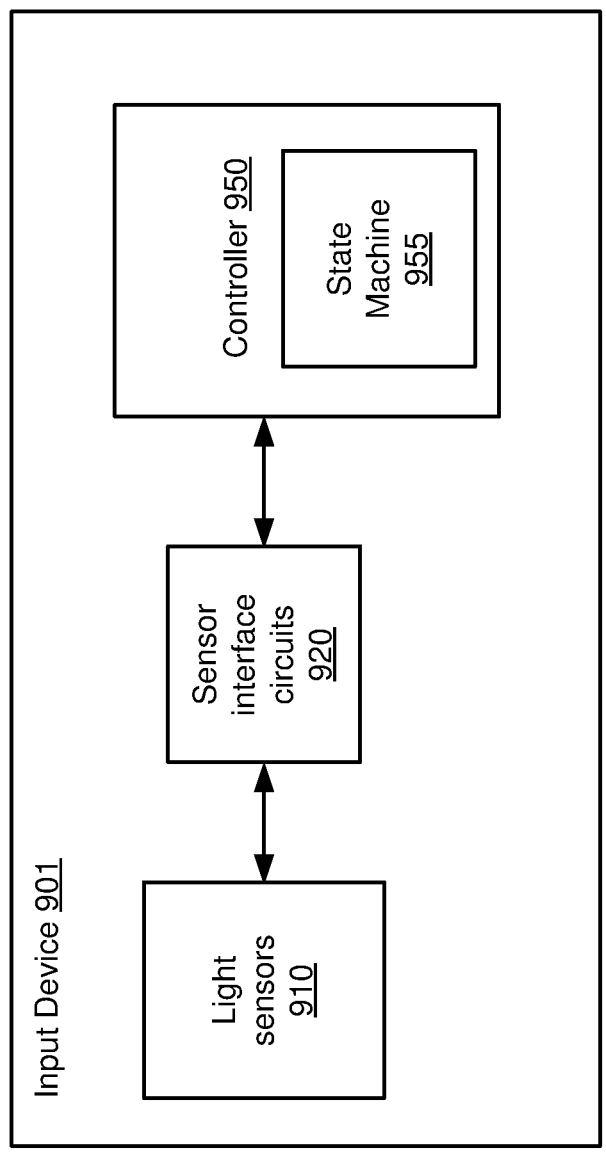

FIG. 9B shows a block diagram of another embodiment of an input device 901. Similar to the input device 900 of FIG. 9A, the input device 901 may include light sensors 910 and a sensor interface circuit 920. The input device 901 may also include a controller 950. In some aspects, the controller 950 may operate similar to the processor 930 and/or the memory 940 of FIG. 9A. For example, the controller 950 may include circuitry such as a state machine 955. The state machine 955 may be configured to perform all or a portion of the operations described with respect to FIGS. 4-7.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for authenticating an input object, comprising:
    identifying a first pixel within image data associated with the input object, wherein the first pixel is a first ridge pixel or a first valley pixel;
    determining a light scattering characteristic of the input object based on differences in pixel values between the first pixel and one or more pixels neighboring the first pixel;
    identifying at least a second ridge pixel and a second valley pixel within image data associated with a plurality of images;

determining a first correlation value based on differences in pixel values between the second ridge pixel and one or more pixels neighboring the second ridge pixel;

determining a second correlation value based on differences in pixel values between the second valley pixel and one or more pixels neighboring the second valley pixel;

determining a reference light scattering characteristic based on at least one of the first correlation value or the second correlation value; and comparing the light scattering characteristic with the reference light scattering characteristic to determine an authentication status of the input object; and generating a validation signal indicating the authentication status of the input object.

2. The method of claim 1, wherein the one or more pixels neighboring the second ridge pixel or the second valley pixel are not separated from the second ridge pixel or the second valley pixel by any number of pixels.

3. The method of claim 1, further comprising:

determining aggregate correlation values associated with the second ridge pixel of each image in the plurality of images to determine the first correlation value; and determining aggregate correlation values associated with the second valley pixel of each image in the plurality of images to determine the second correlation value.

4. The method of claim 1, wherein the second ridge pixel or the second valley pixel is identified based on one or more reference images associated with the plurality of images.

5. The method of claim 4, further comprising:

determining a first reference image based on an aggregate of pixel values across the plurality of images; and determining a second reference image based on a deviation of pixel values across the plurality of images.

6. An input device, comprising:

an optical sensor configured to receive scattered light from an input object;

a processing system coupled to the optical sensor and configured to:

identify a first pixel within image data associated with the input object, wherein the first pixel is a first ridge pixel or a first valley pixel;

determine a light scattering characteristic of the input object based on differences in pixel values between the first pixel and one or more pixels neighboring the first pixel;

identify at least a second ridge pixel and a second valley pixel within image data associated with a plurality of images;

determine a first correlation value based on differences in pixel values between the second ridge pixel and one or more pixels neighboring the second ridge pixel;

determine a second correlation value based on differences in pixel values between the second valley pixel and one or more pixels neighboring the second valley pixel; and determine a reference light scattering characteristic based on at least one of the first correlation value or the second correlation value;

compare the light scattering characteristic with the reference light scattering characteristic to determine an authentication status of the input object; and generate a validation signal indicating the authentication status of the input object.

7. The input device of claim 6, wherein the one or more pixels neighboring the second ridge pixel or the second valley pixel are not separated from the second ridge pixel or the second valley pixel by any number of pixels.

8. The input device of claim 6, wherein the processing system is further configured to:

aggregate correlation values associated with the second ridge pixel of each image in the plurality of images to determine the first correlation value; and aggregate correlation values associated with the second valley pixel of each image in the plurality of images to determine the second correlation value.

9. The input device of claim 6, wherein the second ridge pixel or the second valley pixel is identified based on one or more reference images associated with the plurality of images.

10. The input device of claim 9, wherein the processing system is further configured to:

determine a first reference image based on an aggregate of pixel values across the plurality of images; and determine a second reference image based on a deviation of pixel values across the plurality of images.

11. A non-transitory computer-readable storage medium storing instructions that, when executed by one or more processors of a device, cause the device to:

identify a first pixel within image data associated with an input object, wherein the first pixel is a first ridge pixel or a first valley pixel;

determine a light scattering characteristic of an input object based on differences in pixel values between the first pixel and one or more pixels neighboring the first pixel;

identify at least a second ridge pixel and a second valley pixel within image data associated with a plurality of images;

determine a first correlation value based on differences in pixel values between the second ridge pixel and one or more pixels neighboring the second ridge pixel;

determine a second correlation value based on differences in pixel values between the second valley pixel and one or more pixels neighboring the second valley pixel; and determine a reference light scattering characteristic based on at least one of the first correlation value or the second correlation value;

compare the light scattering characteristic with the reference light scattering characteristic to determine an authentication status of the input object; and generate a validation signal indicating the authentication status of the input object.

* * * * *